US012603512B2

(12) United States Patent     (10) Patent No.:   US 12,603,512 B2

Kuipers     (45) Date of Patent:     Apr. 14, 2026

(54) WEARABLE CHARGER ASSEMBLY

(71) Applicant: Gordon Kuipers, Tempe, AZ (US)

(72) Inventor: Gordon Kuipers, Tempe, AZ (US)

(73) Assignee: Gordon B Kuipers, II, Tempe, AZ (US)

( * ) Notice: Subject to any disclaimer, the term of this patent is extended or adjusted under 35 U.S.C. 154(b) by 727 days.

(21) Appl. No.: 17/967,392

(22) Filed: Oct. 17, 2022

(65) Prior Publication Data

US 2024/0128772 A1     Apr. 18, 2024

(51) Int. Cl.
*H02J 50/10*     (2016.01)
*H02J 7/70*     (2026.01)
*H02J 7/82*     (2026.01)

(52) U.S. Cl.
CPC ................. *H02J 7/70* (2026.01); *H02J 7/82* (2026.01); *H02J 50/10* (2016.02)

(58) Field of Classification Search
CPC ......... H02J 7/0042; H02J 7/0048; H02J 50/10
See application file for complete search history.

(56) References Cited

U.S. PATENT DOCUMENTS

| | | | |
|---|---|---|---|
| 9,746,834 | B2 | 8/2017 | Zhang |
| 9,917,468 | B2 | 3/2018 | Cavallaro |
| 10,069,317 | B2 | 9/2018 | Wang |
| 10,241,476 | B1 | 3/2019 | Moten |
| 10,498,158 | B2 | 12/2019 | Chen |
| 11,042,127 | B2 | 6/2021 | Chae |
| 11,183,861 | B2 | 11/2021 | DeMaio |
| D947,183 | S | 3/2022 | Wu |
| 2021/0305914 | A1* | 9/2021 | Yang .................... A44C 5/0007 |
| 2021/0373505 | A1 | 12/2021 | Raghuprasad |

FOREIGN PATENT DOCUMENTS

WO     WO2021081501     4/2021

* cited by examiner

*Primary Examiner* — Robert Grant

(57) ABSTRACT

A wearable charger assembly includes a housing that has a charging element extending away from the housing. The housing is wearable on a wrist of a user thereby facilitating the charging element to be slid beneath an electronic device is worn on the user's wrist. A charging unit is integrated into the housing and the charging unit is in electrical communication with the charging element. The charging element is in communication with the electronic device when the charging element is slid beneath the electronic device thereby facilitating the charging unit to recharge the electronic device. In this way the charging unit can recharge the electronic device without requiring the user to remove the electronic device from their wrist.

10 Claims, 10 Drawing Sheets

WEARABLE CHARGER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to charger devices and more particularly pertains to a new charger device for wirelessly charging an electronic watch while wearing the electronic watch. The device includes a housing that is wearable on a user's wrist and which has a charging element extending away from the housing. The charging element extends beneath an electronic device worn on the user's wrist and the device includes a charging unit integrated into the housing. The charging unit is in communication with the charging element for wireless recharging the electronic device while the electronic device is being worn.

(2) Description of Related Art Including Information Disclosed Under 37 CFR 1.97 and 1.98

The prior art relates to charger devices including a self recharging electronic watch. The prior art discloses a wireless charger that is shaped into a U-shape to facilitate the wireless charger to be slipped over an electronic watch for charging the electronic watch. The prior art discloses a wearable power supply that includes a wrist strap, a power supply and a charge cord that can be plugged into an electronic device to charge the electronic device. The prior art discloses a wearable inductive charger that includes a wrist band and a disk shaped housing in which an inductive charger is disposed for wirelessly charging an electronic device. The prior art discloses a watch strap for an electronic watch that includes a wrist strap, a power supply attached to the wrist strap and a charge cord extending away from the power supply. The prior art discloses a variety of wrist watch shaped electronic devices that are wearable on a user's wrist.

BRIEF SUMMARY OF THE INVENTION

An embodiment of the disclosure meets the needs presented above by generally comprising a housing that has a charging element extending away from the housing. The housing is wearable on a wrist of a user thereby facilitating the charging element to be slid beneath an electronic device is worn on the user's wrist. A charging unit is integrated into the housing and the charging unit is in electrical communication with the charging element. The charging element is in communication with the electronic device when the charging element is slid beneath the electronic device thereby facilitating the charging unit to recharge the electronic device. In this way the charging unit can recharge the electronic device without requiring the user to remove the electronic device from their wrist.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
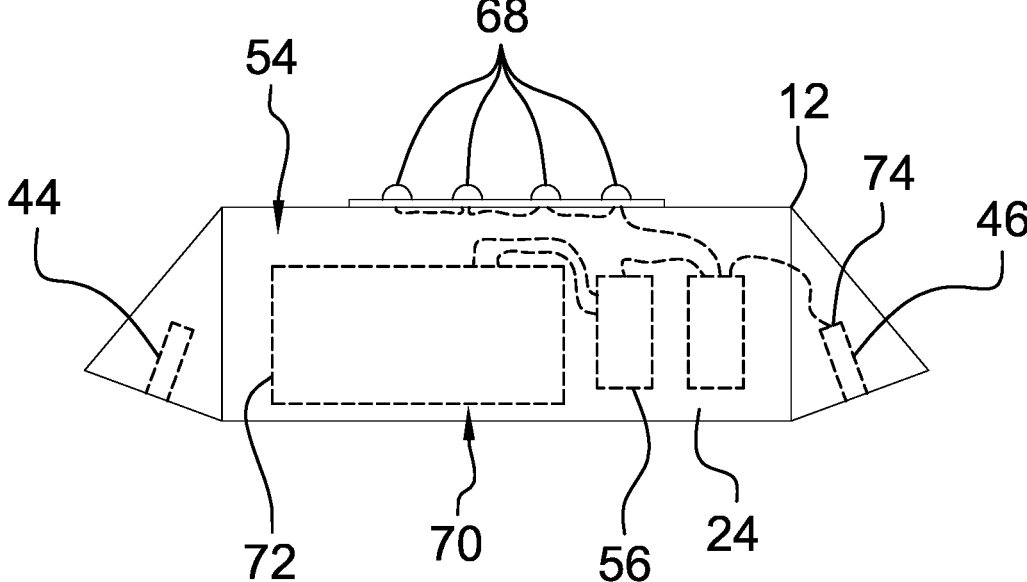
FIG. 1 is a rear phantom view of an embodiment of the disclosure.
Figure 2:
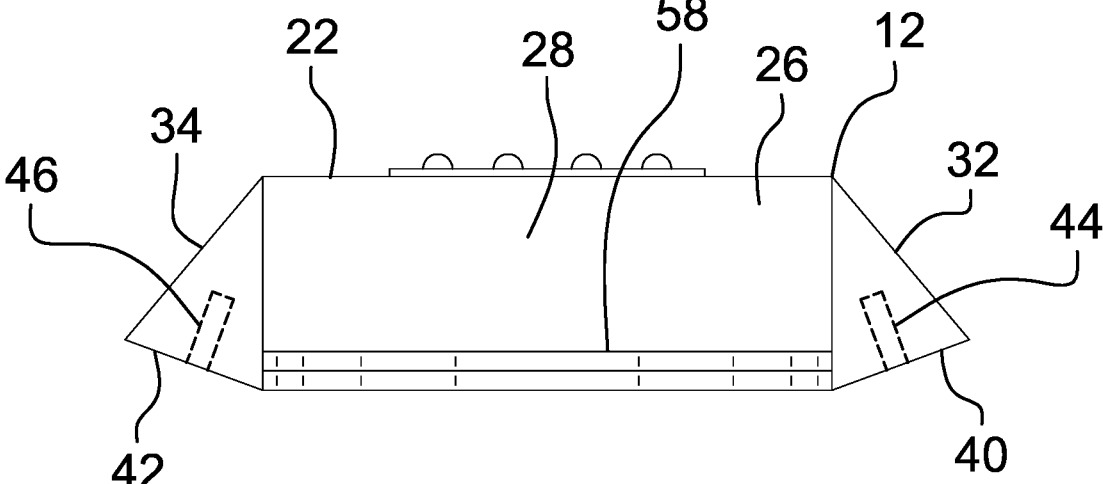
FIG. 2 is a front view of an embodiment of the disclosure.
Figure 3:
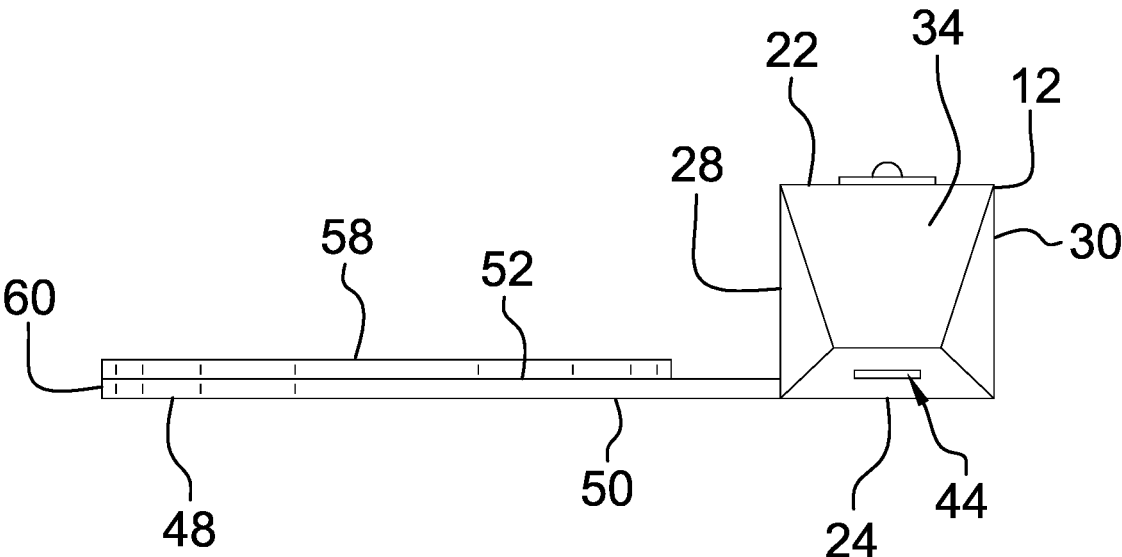
FIG. 3 is a left side view of an embodiment of the disclosure.
Figure 4:
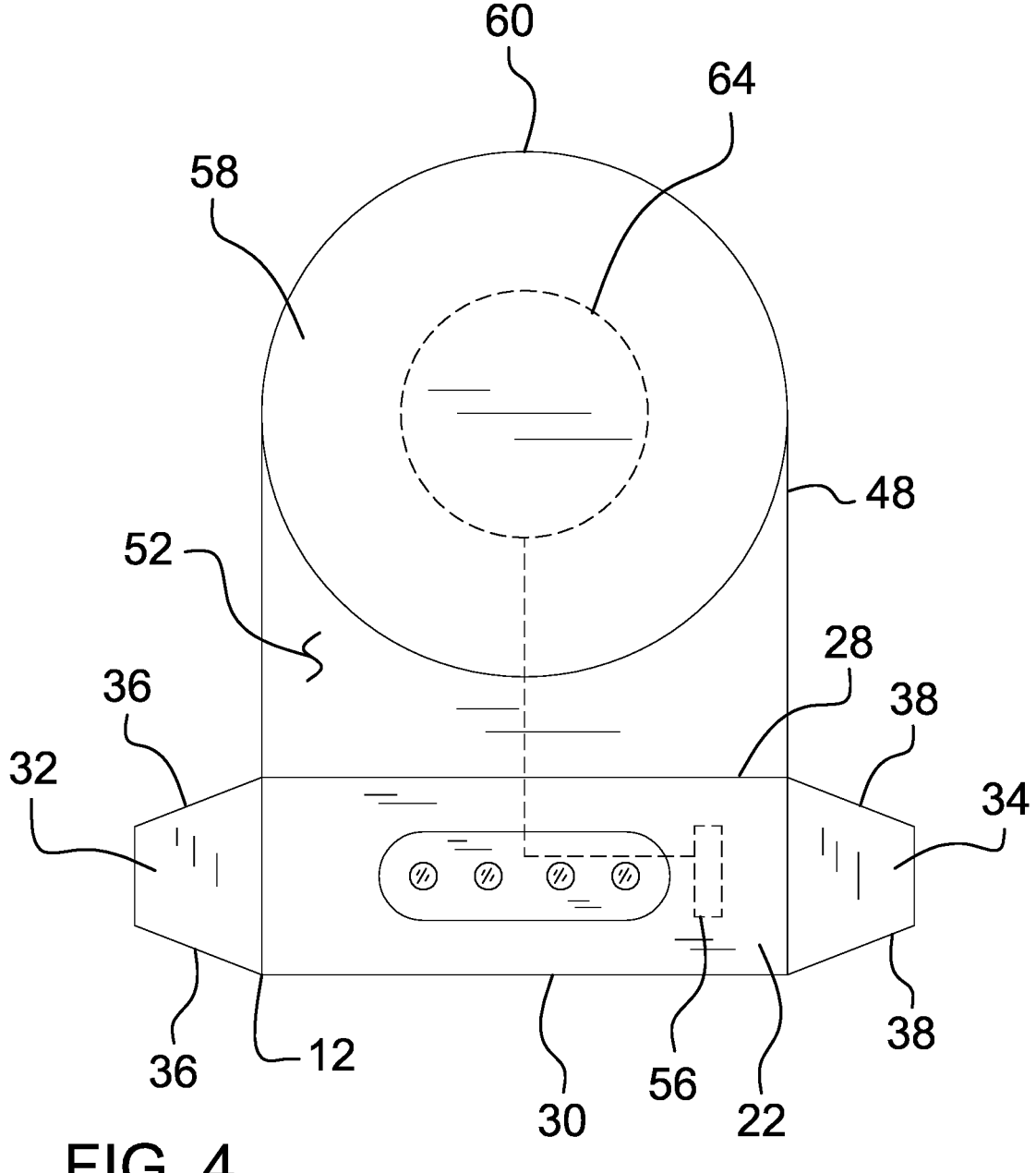
FIG. 4 is a top view of an embodiment of the disclosure.
Figure 5:
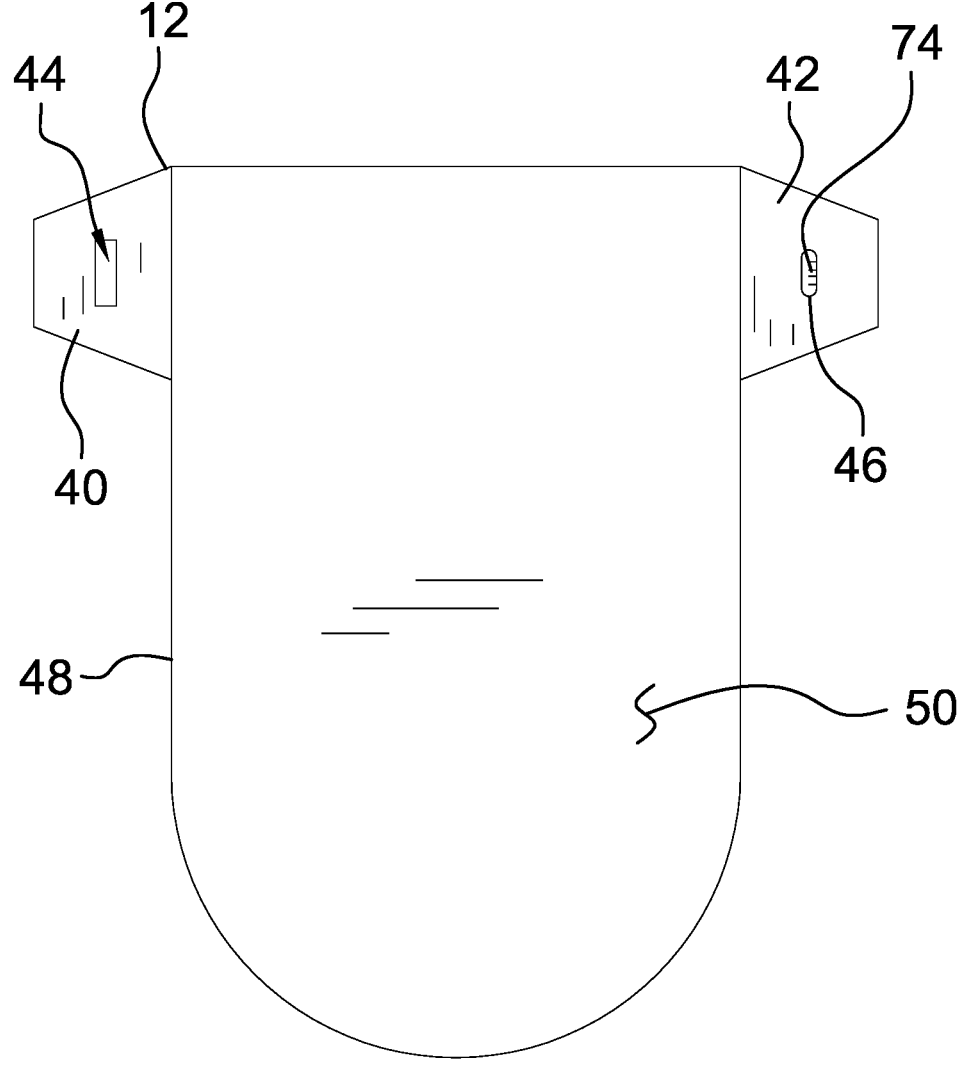
FIG. 5 is a bottom view of an embodiment of the disclosure.
Figure 6:
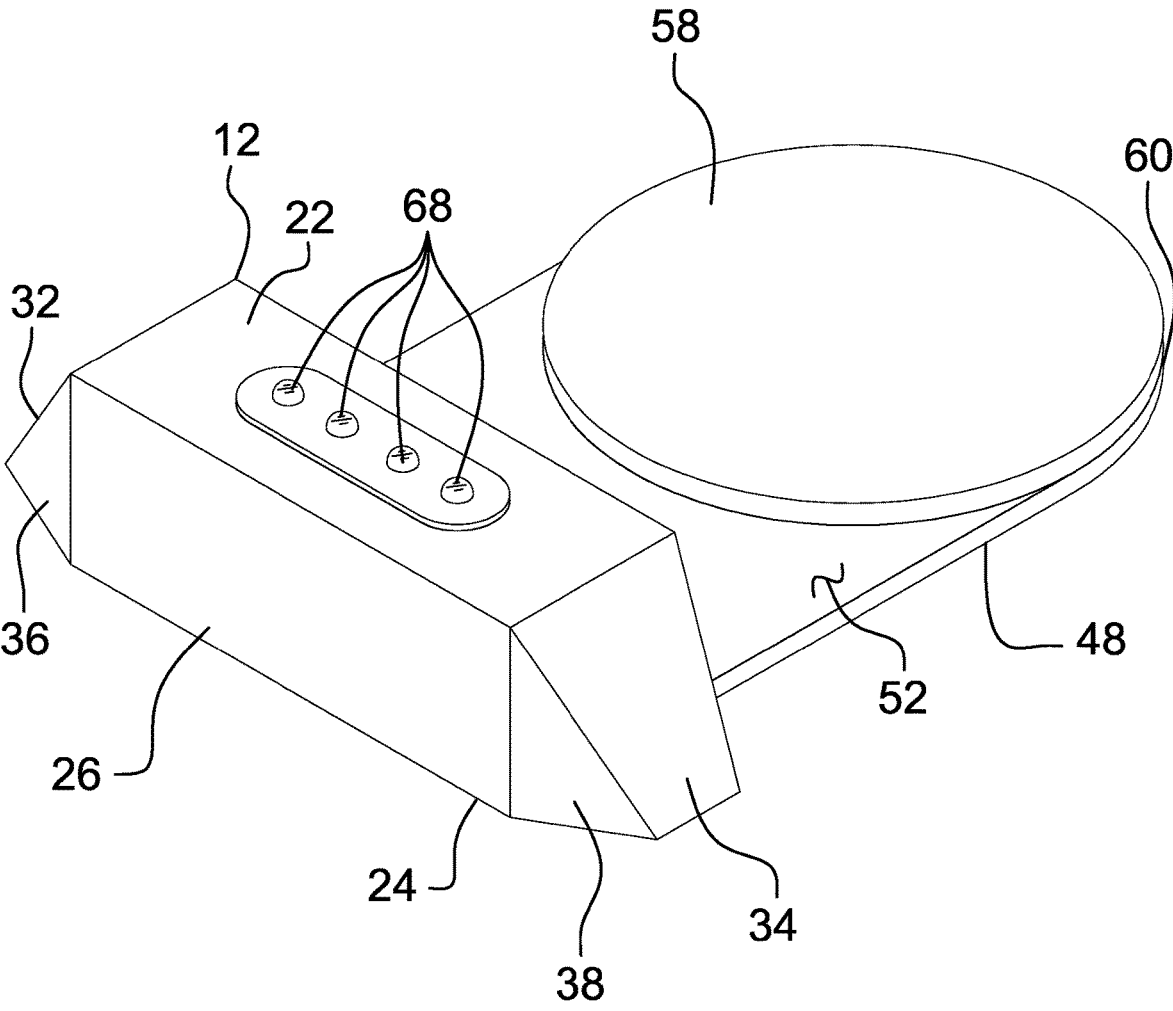
FIG. 6 is a top perspective view of an embodiment of the disclosure.
Figure 7:
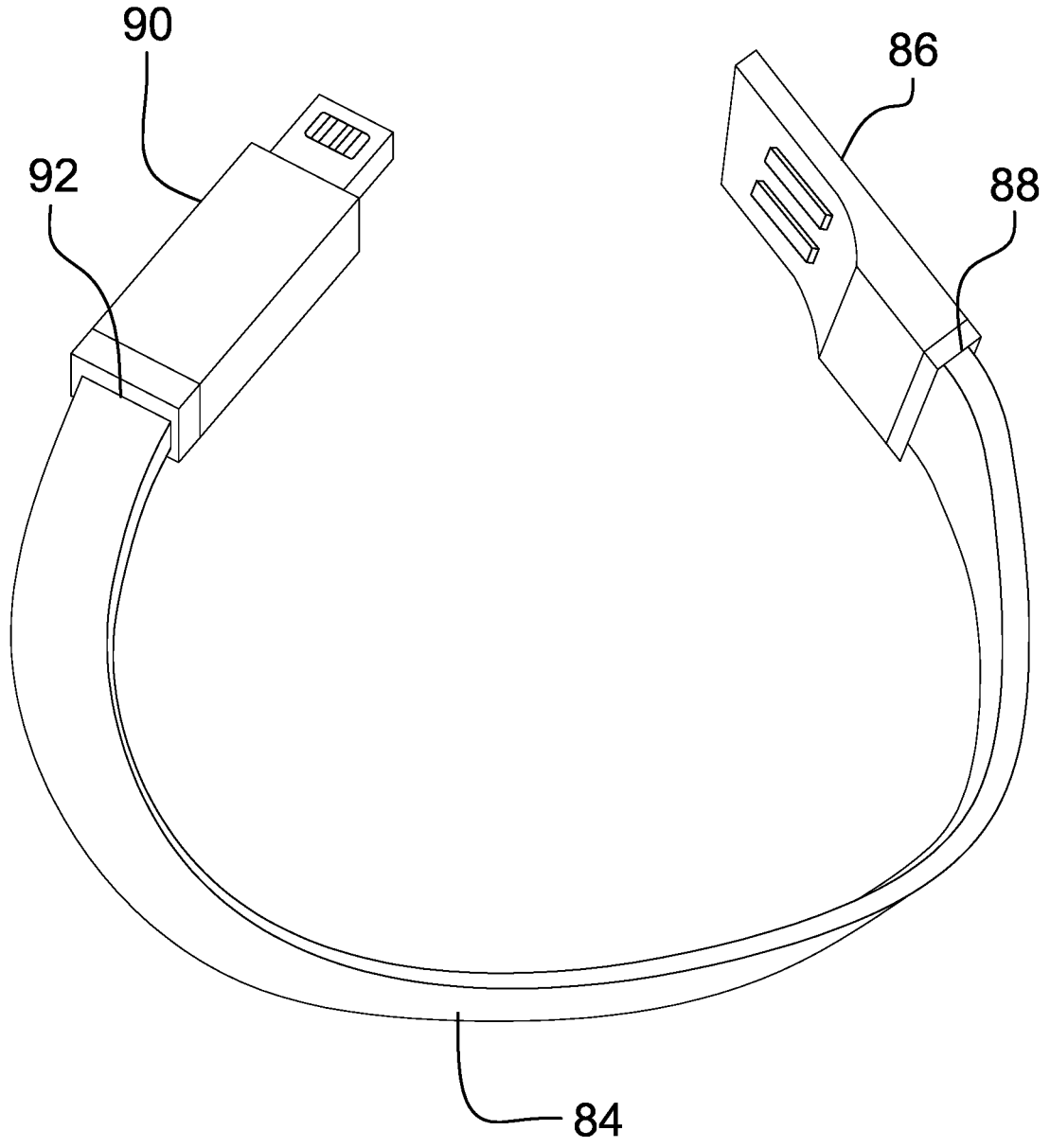
FIG. 7 is a perspective view of charge cord of an embodiment of the disclosure.
Figure 8:
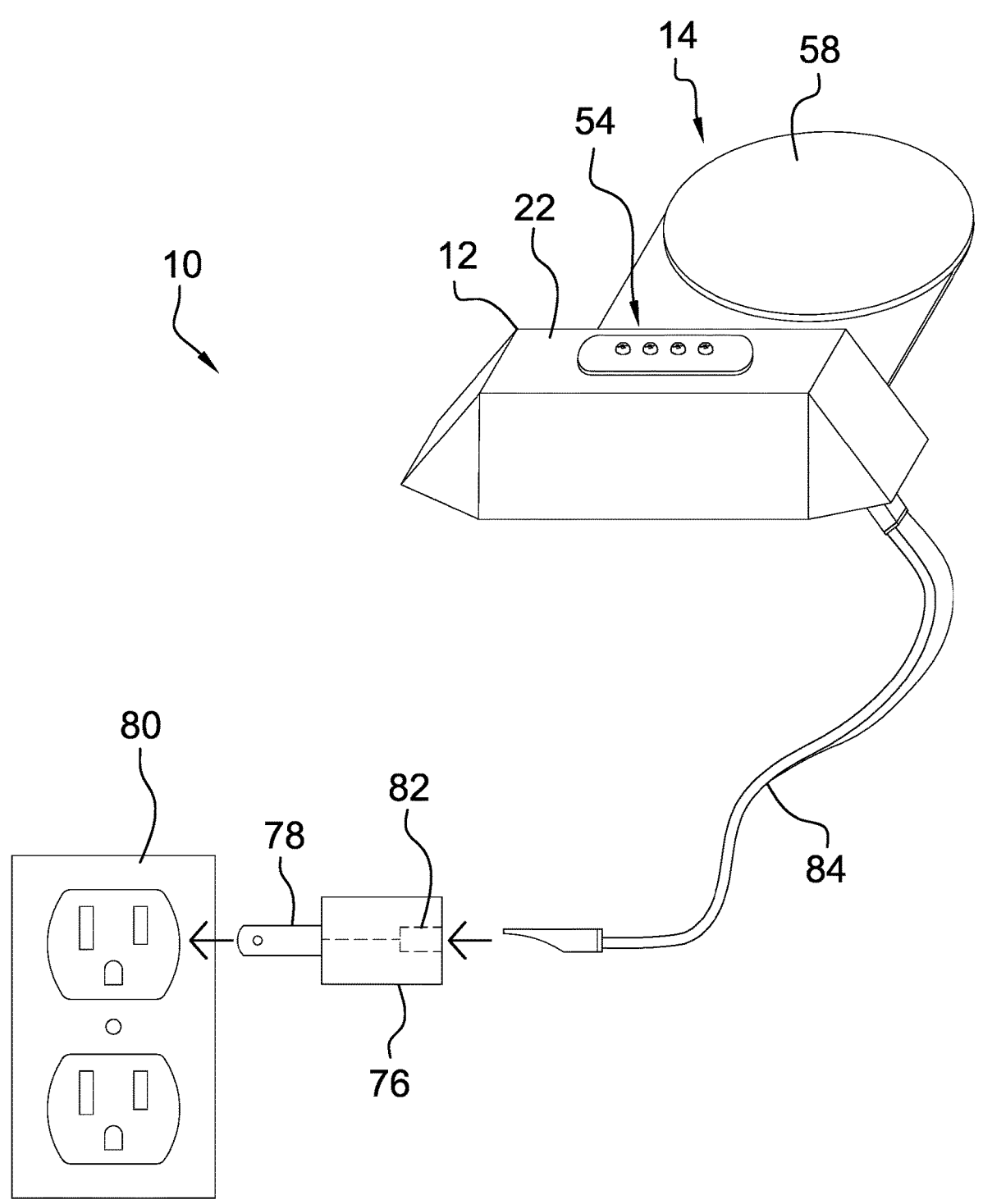
FIG. 8 is a perspective in-use view of an embodiment of the disclosure showing a charge cord being plugged between a housing and a charger.
Figure 9:
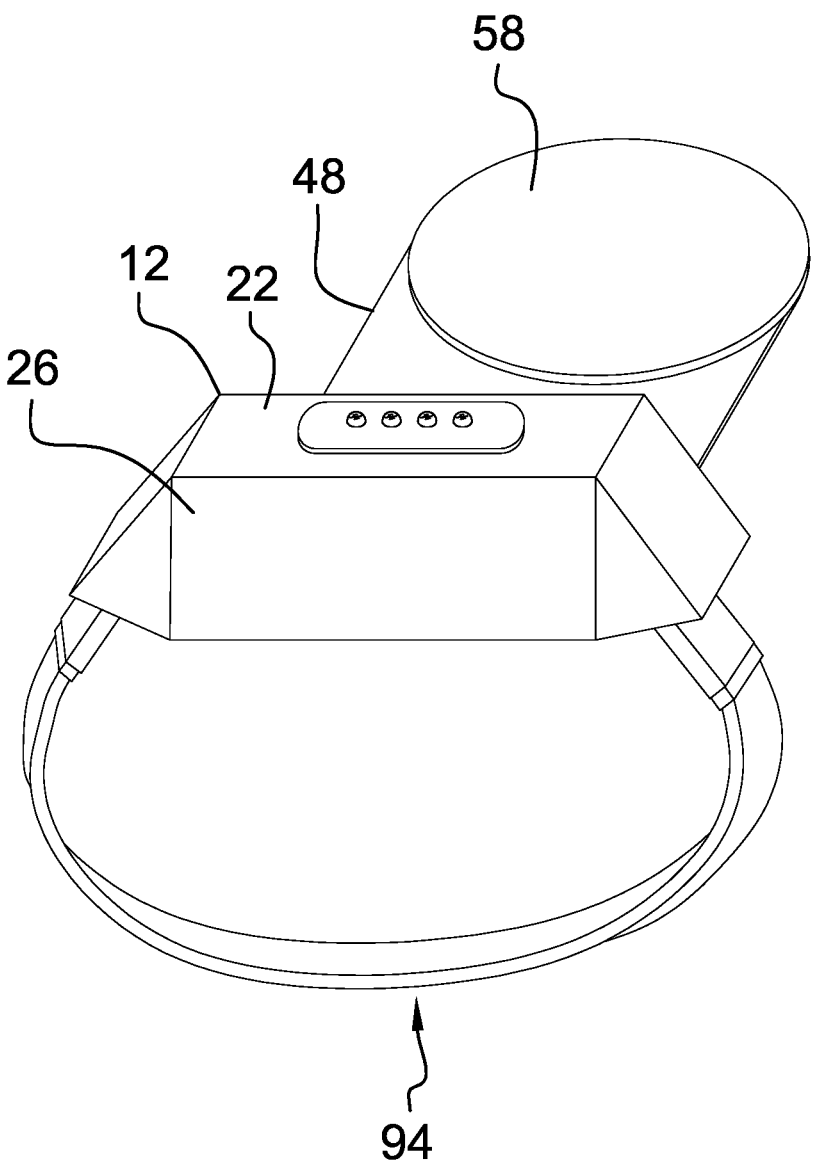
FIG. 9 is a perspective view of an embodiment of the disclosure showing a charge cord being plugged into a housing to form a closed loop.
Figure 10:
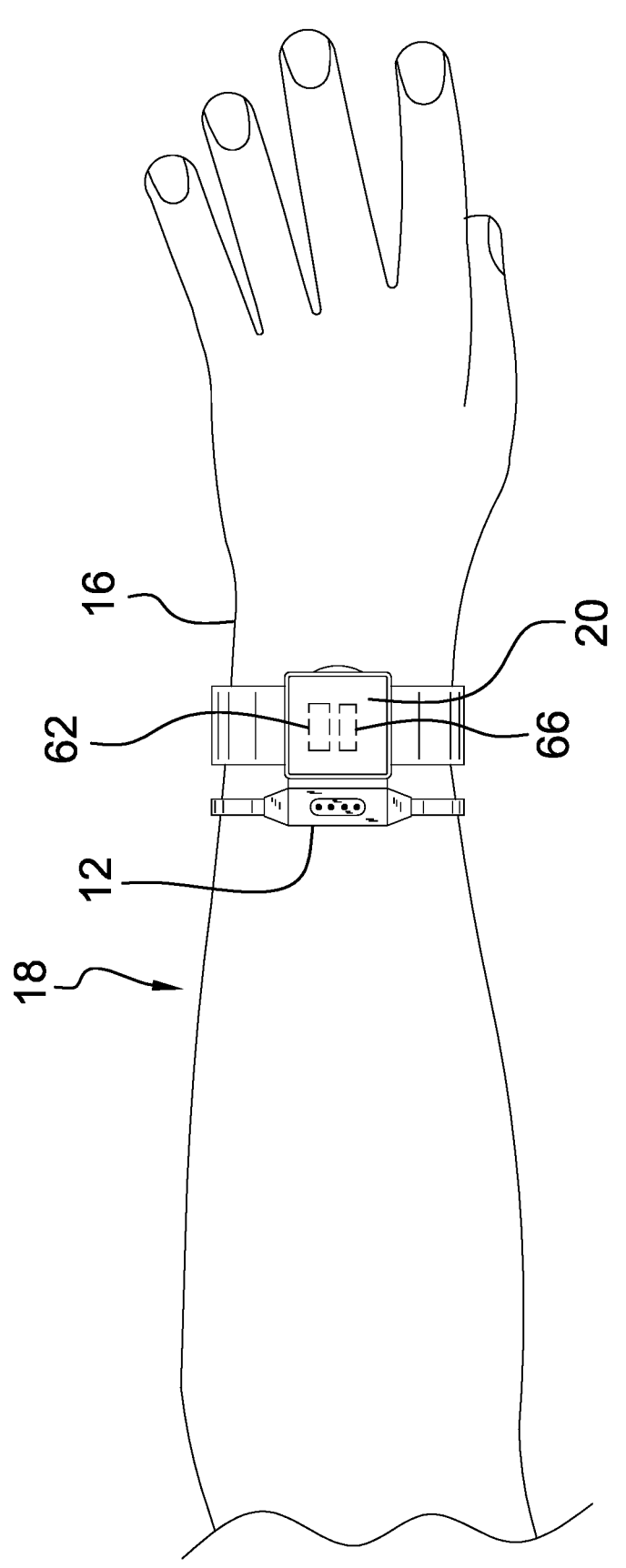
FIG. 10 is a perspective in-use view of a wearable charger assembly according to an embodiment of the disclosure.

With reference now to the drawings, and in particular to FIGS. 1 through 10 thereof, a new charger device embodying the principles and concepts of an embodiment of the disclosure and generally designated by the reference numeral 10 will be described.

As best illustrated in FIGS. 1 through 10, the wearable charger assembly 10 generally comprises a housing 12 that has a charging element 14 which extends away from the housing 12. The housing 12 is wearable on a wrist 16 of a user 18 thereby facilitating the charging element 14 to be slid beneath an electronic device 20 that is worn on the user's wrist 16. The electronic device 20 may be a personal electronic device, such as an Apple Watch manufactured by Apple Inc, 1 Apple Park Way, Cupertino, CA, 95014, or any other wearable electronic device. Furthermore, the electronic device 20 has wireless charging capabilities thereby facilitating the electronic device 20 to be wirelessly charged.

The housing 12 has a top wall 22, a bottom wall 24 and an outer wall 26 extending between the top wall 22 and the bottom wall 24. The outer wall 26 has a forward side 28, a rear side 30, a first lateral side 32, a second lateral side 34, a pair of first angled sides 36 and a pair of second angled sides 38. Each of the forward side 28 and the rear side 30 slopes outwardly between the top wall 22 and the bottom wall 24; each of the first lateral side 32 and the second lateral side 34 slopes outwardly between the top wall 22 and the bottom wall 24 such that the housing 12 has a trapezoidal shape. Each of the first angled sides 36 intersects the first lateral side 32 and a respective one of the forward side 28 and the rear side 30; each of the first angled sides 36 slopes outwardly between the top wall 22 and the bottom wall 24. Additionally, each of the first angled sides 36 angles toward each other between the first lateral side 32 and the respective forward side 28 and rear side 30. Each of the second angled sides 38 intersects the second lateral side 34 and a respective one of the forward side 28 and the rear side 30; each of the second angled sides 38 slopes outwardly between the top wall 22 and the bottom wall 24. Additionally, each of the second angled sides 38 angles toward each other between the second lateral side 34 and the respective forward side 28 and rear side 30.

The bottom wall 24 has a first sloped face 40 which angles upwardly toward the first lateral side 32 and the bottom wall 24 has a second sloped face 42 angling upwardly toward the second lateral side 34. The bottom wall 24 has a recess 44 extending into the first sloped face 40 and the bottom wall 24 has a charge port 46 extending into the second sloped face 42. The housing 12 has a lobe 48 extending away from the forward side 28 of the outer wall 26 and the lobe 48 has a lower surface 50 that is aligned with the bottom wall 24 of the housing 12 and a top surface 52. The lobe 48 is centrally positioned between the first lateral side 32 and the second lateral side 34 of the outer wall 26. Additionally, the lobe 48 slides beneath the electronic device 20 when both the electronic device 20 and the housing 12 are positioned on the user's wrist 16.

A charging unit 54 is integrated into the housing 12 and the charging unit 54 is in electrical communication with the charging element 14. The charging element 14 is in communication with the electronic device 20 when the charging element 14 is slid beneath the electronic device 20 thereby facilitating the charging unit 54 to recharge the electronic device 20. In this way the charging unit 54 can recharge the electronic device without requiring the user 18 to remove the electronic device 20 from their wrist 16. The charging unit 54 comprises a control circuit 56 that is integrated into the housing 12 and the control circuit 56 receives a charge input.

The charging unit 54 includes a charging disk 58 that is attached to the top surface 52 of the lobe 48. The charging disk 58 is positioned adjacent to a distal end 60 of the lobe 48 with respect to the housing 12. The charging disk 58 is comprised of a ferromagnetic material thereby facilitating the charging disk 58 to be in electromagnetic communication with a charging element 62 positioned within the electronic device 20 when the charging disk 58 is positioned beneath the electronic device 20. Additionally, the charging disk 58 is in electrical communication with the control circuit 56 and the control circuit 56 receives the charge input when the charging disk 58 is placed in electromagnetic communication with the charging element 62 in the electronic device 20.

The charging unit 54 includes a transmitter 64 that is integrated into the charging disk 58 and the transmitter 64 is electrically coupled to the control circuit 56. The transmitter 64 is actuated to broadcast a charging signal when the control circuit 56 receives the charge input. Additionally, the transmitter 64 is in electromagnetic communication with the charging disk 58 such that the charging disk 58 communicates the charging signal to the charging element 14 in the electronic device 20 thereby charging a power supply 66 in the electronic device 20. The transmitter 64 may comprise a radio frequency transmitter or the like and the transmitter 64 may employ magnetic induction for remotely transmitting an electrical current.

A plurality of light emitters 68 is each of the light emitters 68 is disposed on the top wall 22 of the housing 12 such that each of the light emitters 68 is visible to the user 18 when the housing 12 is worn on the user's wrist 16. Each of the light emitters 68 is electrically coupled to the control circuit 56. Additionally, the plurality of light emitters 68 is sequentially actuated in accordance with a charge level of the power supply 66 in the electronic device 20 that is sensed by the control circuit 56. In this way the plurality of light emitters 68 can visually communicate the charge level of the electronic device 20 to the user 18. Each of the light emitters 68 may comprise a light emitting diode or other type of electronic light emitter.

A power supply 70 is integrated into the housing 12 and the power supply 70 is electrically coupled to the control circuit 56. The power supply 70 comprises a rechargeable battery 72 that is positioned in the housing 12 and the rechargeable battery 72 is electrically coupled to the control circuit 56. The power supply 70 includes a charging contact 74 that is integrated into the charge port 46 in the second sloped face 42 of the bottom wall 24 and the charging contact 74 is electrically coupled to the rechargeable battery 72. A charger 76 is included that has a pair of male electrical contacts 78 that is each insertable into a female electrical outlet 80. The charger 76 has an output port 82 that is in electrical communication with the male electrical contacts 78.

A charge cord 84 is provided and the charge cord 84 has a first plug 86 that is electrically coupled to a first end 88 of the charge cord 84 and a second plug 90 that is electrically coupled to a second end 92 of the charge cord 84. The first plug 86 is electrically matable to the charging contact 74 in the charge port 46 and the second plug 92 is electrically matable to the output port 82 in the charger 76 for charging the rechargeable battery 72. The second plug 92 is matable to the recess 44 in the first sloped face 40 of the bottom wall 24 of the housing 12 when the first plug 86 is plugged into the charge port 46. In this way the charge cord 84 defines a wrist band 94 to retain the housing 12 on the user's wrist 16.

In use, the charger 76 is plugged into the female electrical outlet 80 and the charge cord 84 is connected between the charger 76 and the housing 12 to charge the power supply 70 in the charging unit 54. The housing 12 is positioned on the user's wrist 16 such that the charging element 14 is positioned beneath the electronic device 20 worn on the user's wrist 16. Furthermore, the charge cord 84 is plugged into the charge port 46 and the recess 44 in the housing 12 to define a wrist band 94 for retaining the housing 12 on the user's wrist 16. In this way the electronic device 20 can be wirelessly charged while the electronic device 20 is being worn on the user's wrist 16. Thus, the user 18 does not have to remove the electronic device 20 from their wrist 16 to recharge the electronic device 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wearable charger assembly for recharging an electronic device while the electronic device is being worn by a user, said assembly comprising:

a housing having a charging element extending away from said housing, said housing being wearable on a wrist of a user thereby facilitating said charging element to be slid beneath an electronic device being worn on the user's wrist;

a charging unit being integrated into said housing, said charging unit being in electrical communication with said charging element, said charging element being in communication with the electronic device when said charging element is slid beneath the electronic device thereby facilitating said charging unit to recharge the electronic device wherein said charging unit is configured to recharge the electronic device without requiring the user to remove the electronic device from their wrist;

wherein said housing has a top wall, a bottom wall and an outer wall extending between said top wall and said bottom wall, said outer wall having a forward side, a rear side, a first lateral side, a second lateral side, a pair of first angled sides and a pair of second angled sides;

wherein each of said forward side and said rear side slopes outwardly between said top wall and said bottom wall;

wherein each of said first lateral side and said second lateral side slopes outwardly between said top wall and said bottom wall such that said housing has a trapezoidal shape;

wherein each of said first angled sides intersects said first lateral side and a respective one of said forward side and said rear side, each of said first angled sides sloping outwardly between said top wall and said bottom wall, each of said first angled sides angling toward each other between said first lateral side and said respective forward side and rear side;

wherein each of said second angled sides intersects said second lateral side and a respective one of said forward side and said rear side, each of said second angled sides sloping outwardly between said top wall and said bottom wall, each of said second angled sides angling toward each other between said second lateral side and said respective forward side and rear side;

wherein said bottom wall has a first sloped face angling upwardly toward said first lateral side; and wherein said bottom wall has a second sloped face angling upwardly toward said second lateral side.

2. The assembly according to claim 1, wherein:

said bottom wall has a recess extending into said first sloped face; and said bottom wall has a charge port extending into said second sloped face.

3. The assembly according to claim 1, wherein said housing has a lobe extending away from said forward side of said outer wall, said lobe having a lower surface being aligned with said bottom wall of said housing and a top surface, said lobe being centrally positioned between said first lateral side and said second lateral side of said outer wall, said lobe sliding beneath the electronic device when both the electronic device and said housing are positioned on the user's wrist.

4. The assembly according to claim 3, wherein said charging unit comprises:

a control circuit being integrated into said housing, said control circuit receiving a charge input; and a charging disk being attached to said top surface of said lobe, said charging disk being positioned adjacent to a distal end of said lobe with respect to said housing, said charging disk being comprised of an ferromagnetic material thereby facilitating said charging disk to be in electromagnetic communication with a charging element positioned within the electronic device when said charging disk is positioned beneath the electronic device, said charging disk being in electrical communication with said control circuit, said control circuit receiving said charge input when said charging disk is placed in electromagnetic communication with the charging element in the electronic device.

5. The assembly according to claim 4, wherein said charging unit includes a transmitter being integrated into said charging disk, said transmitter being electrically coupled to said control circuit, said transmitter being actuated to broadcast a charging signal when said control circuit receives said charge input, said transmitter being in electromagnetic communication with said charging disk such that said charging disk communicates said charging signal to the charging element in the electronic device thereby charging a power supply in the electronic device.

6. The assembly according to claim 4, wherein said charging unit includes a plurality of light emitters, each of said light emitters being disposed on said top wall of said housing such that each of said light emitters is visible to the user when said housing is worn on the user's wrist, each of said light emitters being electrically coupled to said control circuit, said plurality of light emitters being sequentially actuated in accordance with a charge level of the power supply in the electronic device that is sensed by said control circuit wherein said plurality of light emitters is configured to visually communicate the charge level of the electronic device to the user.

7. The assembly according to claim 4, wherein:

said bottom wall of said housing has a charge port extending into said second sloped face; and said charging unit includes a power supply being integrated into said housing, said power supply being electrically coupled to said control circuit, said power supply comprising:

a rechargeable battery being positioned in said housing, said rechargeable battery being electrically coupled to said control circuit;

a charging contact being integrated into said charge port in said second sloped face of said bottom wall, said charging contact being electrically coupled to said rechargeable battery; and a charger having a pair of male electrical contacts each being insertable into a female electrical outlet, said charger having an output port being in electrical communication with said male electrical contacts.

8. The assembly according to claim 7, wherein said power supply includes a charge cord having a first plug being electrically coupled to a first end of said charge cord and a second plug being electrically coupled to a second end of said charge cord, said first plug being electrically matable to said charging contact in said charge port, said second plug being electrically matable to said output port in said charger for charging said rechargeable battery.

9. The assembly according to claim 8, wherein:

said bottom wall of said housing has a recess extending into said first sloped face; and said second plug being matable to said recess in said first sloped face of said bottom wall of said housing when said first plug is plugged into said charge port such that said charge cord defines a wrist band wherein said wrist band is configured to retain said housing on the user's wrist.

10. A wearable charger assembly for recharging an electronic device while the electronic device is being worn by a user, said assembly comprising:

a housing having a charging element extending away from said housing, said housing being wearable on a wrist of a user thereby facilitating said charging element to be slid beneath an electronic device being worn on the user's wrist, said housing having a top wall, a bottom wall and an outer wall extending between said top wall and said bottom wall, said outer wall having a forward side, a rear side, a first lateral side, a second lateral side, a pair of first angled sides and a pair of second angled sides, each of said forward side and said rear side sloping outwardly between said top wall and said bottom wall, each of said first lateral side and said second lateral side sloping outwardly between said top wall and said bottom wall such that said housing has a trapezoidal shape, each of said first angled sides intersecting said first lateral side and a respective one of said forward side and said rear side, each of said first angled sides sloping outwardly between said top wall and said bottom wall, each of said first angled sides angling toward each other between said first lateral side and said respective forward side and rear side, each of said second angled sides intersecting said second lateral side and a respective one of said forward side and said rear side, each of said second angled sides sloping outwardly between said top wall and said bottom wall, each of said second angled sides angling toward each other between said second lateral side and said respective forward side and rear side, said bottom wall having a first sloped face angling upwardly toward said first lateral side, said bottom wall having a second sloped face angling upwardly toward said second lateral side, said bottom wall having a recess extending into said first sloped face, said bottom wall having a charge port extending into said second sloped face, said housing having a lobe extending away from said forward side of said outer wall, said lobe having a lower surface being aligned with said bottom wall of said housing and a top surface, said lobe being centrally positioned between said first lateral side and said second lateral side of said outer wall, said lobe sliding beneath the electronic device when both the electronic device and said housing are positioned on the user's wrist; and a charging unit being integrated into said housing, said charging unit being in electrical communication with said charging element, said charging element being in communication with the electronic device when said charging element is slid beneath the electronic device thereby facilitating said charging unit to recharge the electronic device wherein said charging unit is configured to recharge the electronic device without requiring the user to remove the electronic device from their wrist, said charging unit comprising:

a control circuit being integrated into said housing, said control circuit receiving a charge input;

a charging disk being attached to said top surface of said lobe, said charging disk being positioned adjacent to a distal end of said lobe with respect to said housing, said charging disk being comprised of an ferromagnetic material thereby facilitating said charging disk to be in electromagnetic communication with a charging element positioned within the electronic device when said charging disk is positioned beneath the electronic device, said charging disk being in electrical communication with said control circuit, said control circuit receiving said charge input when said charging disk is placed in electromagnetic communication with the charging element in the electronic device;

a transmitter being integrated into said charging disk, said transmitter being electrically coupled to said control circuit, said transmitter being actuated to broadcast a charging signal when said control circuit receives said charge input, said transmitter being in electromagnetic communication with said charging disk such that said charging disk communicates said charging signal to the charging element in the electronic device thereby charging a power supply in the electronic device;

a plurality of light emitters, each of said light emitters being disposed on said top wall of said housing such that each of said light emitters is visible to the user when said housing is worn on the user's wrist, each of said light emitters being electrically coupled to said control circuit, said plurality of light emitters being sequentially actuated in accordance with a charge level of the power supply in the electronic device that is sensed by said control circuit wherein said plurality of light emitters is configured to visually communicate the charge level of the electronic device to the user; and a power supply being integrated into said housing, said power supply being electrically coupled to said control circuit, said power supply comprising:

a rechargeable battery being positioned in said housing, said rechargeable battery being electrically coupled to said control circuit;

a charging contact being integrated into said charge port in said second sloped face of said bottom wall, said charging contact being electrically coupled to said rechargeable battery;

a charger having a pair of male electrical contacts each being insertable into a female electrical outlet, said charger having an output port being in electrical communication with said male electrical contacts; and a charge cord having a first plug being electrically coupled to a first end of said charge cord and a second plug being electrically coupled to a second end of said charge cord, said first plug being electrically matable to said charging contact in said charge port, said second plug being electrically matable to said output port in said charger for charging said rechargeable battery, said second plug being matable to said recess in said first sloped face of said bottom wall of said housing when said first plug is plugged into said charge port such that said charge cord defines a wrist band wherein said wrist band is configured to retain said housing on the user's wrist.

\* \* \* \* \*